United States Patent Office 3,812,135
Patented May 21, 1974

3,812,135
PYRROLOINDOLE AND PYRIDOINDOLE DERIVATIVES
Tadashi Okamoto, Ashiya, Takeshi Akase, Nishinomiya, Takahiro Izumi, Takarazuka, and Shigeho Inaba, Takarazuka, and Hisao Yamamoto, Nishinomiya, Japan, assignors to Sumitomo Chemical Company Limited, Osaka, Japan
No Drawing. Filed Feb. 28, 1972, Ser. No. 230,035
Claims priority, application Japan, Mar. 6, 1971, 46/11,966
Int. Cl. C07d 27/36
U.S. Cl. 260—293.55    2 Claims

ABSTRACT OF THE DISCLOSURE

Novel indole derivatives of the formula,

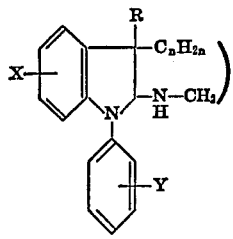

wherein X and Y are each hydrogen, halogen, lower alkyl or lower alkoxy; R is hydrogen or lower alkyl; and $n$ is 1 or 2, or salts thereof having high anti-inflammatory activity. The indole derivatives are prepared by reducing a 2-oxyindole derivative of the formula,

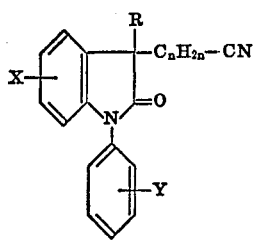

wherein X, Y, R and $n$ are as defined above.

---

The present invention relates to novel indole derivatives and salts thereof as well as a process for producing the same.

More particularly, the present invention relates to novel pyrroloindole derivatives and pyridoindole derivatives represented by the formula,

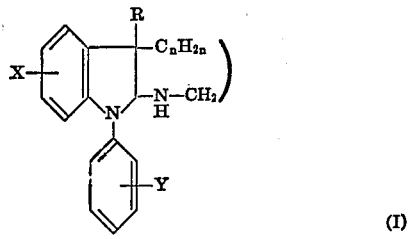

wherein X and Y are each hydrogen, halogen, lower alkyl or lower alkoxy; R is hydrogen or lower alkyl; and $n$ is 1 or 2, or salts thereof as well as a process for producing the same.

In the compounds represented by the general formula (I), the term "alkyl" means both straight and branched chain aliphatic hydrocarbon radicals, and the lower alkyl group includes, for example, methyl, ethyl, n-propyl, iso-propyl, n-butyl, iso-butyl and tertiary butyl groups; and the lower alkoxy group includes, for example, methoxy, ethoxy, n-propoxy, isopropoxy, n-butoxy and tertiary butoxy groups; and halogen includes chlorine, bromine, fluorine and iodine.

The compounds of the formula (I), which include novel compounds, have remarkable pharmacological properties, particularly as anti-inflammatory and analgesic effects and they are also useful as intermediates for the synthesis of other medicines.

The novel indole derivatives of this invention and the corresponding salts are effective in the prevention and inhibition of granuloma tissue formation. They are of value in the treatment of arthritic and dermatological disorders and in like conditions which are responsive to treatment with anti-inflammatory agents. In addition, the compounds of this invention have useful degree of antipyrretic and analgesic activities. For these purposes, they are administered in the form of pharmaceutical compositions, normally orally, e.g., in tablets or capsules, the suitable dosage depending, of course, upon the particular compound being used and the type of severity of the condition being treated. Although the suitable dosage of these compounds of this invention to be used in such manner depends on the compound employed and the particular type of disease condition to be treated, useful oral dosage levels of the compounds are in the range of 1.0–2000 mg. per day depending on the activity of the specific compound to be used and on the reaction sensitivity of the patient.

One object of the present invention is to provide novel indole derivatives having excellent anti-inflammatory effects. Another object of the present invention is to provide a novel and useful process for producing such valuable compounds. A further object of the invention is to provide a novel pharmaceutical composition containing these compounds as the effective ingredient. Still further objects will be apparent from the following description.

According to the present invention, the novel indole derivative of the formula (I) can be produced by reducing a 2-oxyindole derivative represented by the formula,

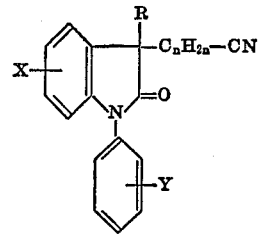

(II)

wherein X, Y, R and $n$ are as defined above, and, if necessary, converting the resulting indole derivative into its acid addition salt.

The above-mentioned 2-oxyindole derivatives of the formula (II) are also novel compounds, and are produced, for example, by reacting chloroacetonitrile with the corresponding 2-oxyindole derivative, in the case when $n$ is 1, and by reacting acrylonitrile with the corresponding 2-oxyindole derivative, in the case when $n$ is 2.

The present invention is practiced by reducing a 2-oxyindole derivative represented by the above-mentioned formula (II) in a suitable organic solvent. The selection of the solvent is dependent on the reducing agent employed and the solvent is selected from the group consisting of ether, tetrahydrofuran, dioxane, methanol, ethanol, and the like. The reducing agents which may be used in the process of the present invention include metal hydride complex compounds such as lithium aluminum hydride and sodium and alcohols, and the like.

The reaction temperature is preferably within a range from room temperature to the boiling point of the solvent used. The indole derivatives of the formula (I) obtained as a reduction product can be converted into salts thereof by treating with an acid. The acids which may be used include, for example, hydrochloric acid, sulfuric acid, phosphoric acid, citric aicd, succinic acid, tartaric acid, adipic acid, maleic acid, etc.

According to the process of the present invention, the following compounds can be obtained.

9-phenyl-2,3,4,4a,9,9a-hexahydro-1H-pyrido[2,3-b]indole hydrochloride 4a-methyl-9-phenyl-2,3,4,4a,9,9a-hexahydro-1H-pyrido[2,3-b]indole hydrochloride 4a-methyl-6-methoxy-9-(p-methoxyphenyl)-2,3,4,4a,9,9a-hexahydro-1H-pyrido[2,3-b]indole hydrochloride 4a-methyl-6-chloro-9-phenyl-2,3,4,4a,9,9a-hexahydro-1H-pyrido[2,3-b]indole hydrochloride 3a-methyl-8-phenyl-2,3,3a,8,8a-pentahydro-1H-pyrrolo[2,3-b]indole hydrochloride 8-phenyl-2,3,3a,8,8a-pentahydro-1H-pyrrolo[2,3-b]indole hydrochloride 3,a-methyl-5-methoxy-8-phenyl-2,3,3a,8,8a-pentahydro-1H-pyrrolo[2,3-b]indole hydrochloride 3a-methyl-5-methyl-8-phenyl-2,3,3a,8,8a-pentahydro-1H-pyrrolo[2,3-b]indole hydrochloride The novel indole derivatives of the present invention possess excellent anti-inflammatory effects in animal tests with low toxicity. Illustratively, 4a-methyl-9-phenyl-2,3,4,4a,9,9a-hexahydro-1H-pyrido[2,3-b]indole hydrochloride shows remarkable inhibitory action for carrageenin-induced edema in rat.

The following example is given to illustrate the present invention more particularly, but it is not intended to limit the present invention to it.

EXAMPLE 1

To a suspension of 4 g. of lithium aluminum hydride in 50 ml. of tetrahydrofuran was added dropwise a solution of 12.6 g. of 1-phenyl-3-methyl-3-(2'-cyanoethyl)-2-oxyindole in 100 ml. of tetrahydrofuran. The mixture was stirred at room temperature for 20 hours. Water was added carefully to the reaction mixture. The resulting precipitate was filtered off and the filtrate was concentrated under reduced pressure.

The residue was dissolved in toluene and then extracted with 2 N hydrochloric acid. The aqueous hydrochloric acid solution was made alkaline with an aqueous sodium hydroxide solution and then extracted with dichloroethane.

The dichloroethane extract was dried over sodium sulfate and dichloroethane was distilled off to obtain 12 g. of an oily substance. The oily substance was dissolved in toluene and crystals were then separated by the addition of hydrogen chloride. The precipitate was collected by filtration and recrystallized from isopropanol to obtain 4a-methyl-9-phenyl-2,3,4,4a,9,9a-hexahydro-1H-pyrido[2,3-b]indole hydrochloride having a melting point of 222°–223° C. (decomposition).

What is claimed is:

1. A indole derivative of the formula,

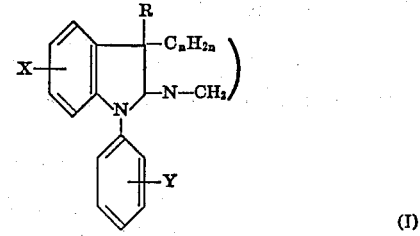

wherein X and Y are each hydrogen, halogen, lower alkyl or lower alkoxy; R is hydrogen or lower alkyl; and $n$ is 1 or 2, or a salt thereof.

2. 4a-methyl-9-phenyl-2,3,4,4a,9,9a-hexahydro-1H-pyrido[2,3-b]indole and its salt.

References Cited

UNITED STATES PATENTS 3,457,268    7/1969    Frey et al. _____ 260—293

HENRY R. JILES, Primary Examiner

G. T. TODD, Assistant Examiner

U.S. Cl. X.R.

260—325, 326.5 B, 326.85, 999